United States Patent [19]

Stuart, Jr. et al.

[11] 4,113,545

[45] Sep. 12, 1978

[54] PIPE JOINT WRAPPING MACHINE

[75] Inventors: Linden Stuart, Jr., Chester, N.J.; Harry Robert Davis, Lost Creek, W. Va.

[73] Assignee: Stuart Steel Protection Corporation, South Bound Brook, N.J.

[21] Appl. No.: 820,292

[22] Filed: Jul. 29, 1977

[51] Int. Cl.² ................. B32B 31/00; B65H 81/00
[52] U.S. Cl. ................. 156/392; 156/428; 156/577; 156/584
[58] Field of Search ............. 156/392, 391, 53, 187, 156/247, 428, 430, 457, 503, 545, 540, 577, 579, 584, 425, 446, 505; 242/128, 65

[56] References Cited

U.S. PATENT DOCUMENTS

| 3,230,123 | 1/1966 | Christensen | 156/584 |
| 3,256,128 | 6/1966 | Richardson et al. | 156/584 |
| 3,470,057 | 9/1969 | Stuart, Jr. et al. | 156/392 |
| 3,547,731 | 12/1970 | Stuart, Jr. et al. | 156/392 |
| 3,740,299 | 6/1973 | Schroter et al. | 156/577 |
| 3,798,108 | 3/1974 | Ioannilli | 156/584 X |

Primary Examiner—Michael G. Wityshyn
Attorney, Agent, or Firm—Kenyon & Kenyon

[57] ABSTRACT

A portable pipe joint wrapping machine is provided wherein a pipe enveloping frame which is rotatably supported concentrically with respect to a pipe comprises a reel assembly that is mounted on the frame and that is adapted to receive and rotatably support a roll of wrapping material of the cold wrap type that has a separator sheet between adjoining plies of the roll in position for feeding wrapping material from the roll to the pipe to be wrapped about the pipe while rotating the frame about the pipe, a sheet receiving assembly being provided powered by a wheel that is in frictional contact with the pipe and that is rotated when said frame is rotated about the pipe whereby the separator sheet is received by said sheet receiving assembly as it is stripped from the wrapping material during the rotation of the frame about the pipe with concomitant application of the wrapping material to the pipe.

7 Claims, 4 Drawing Figures

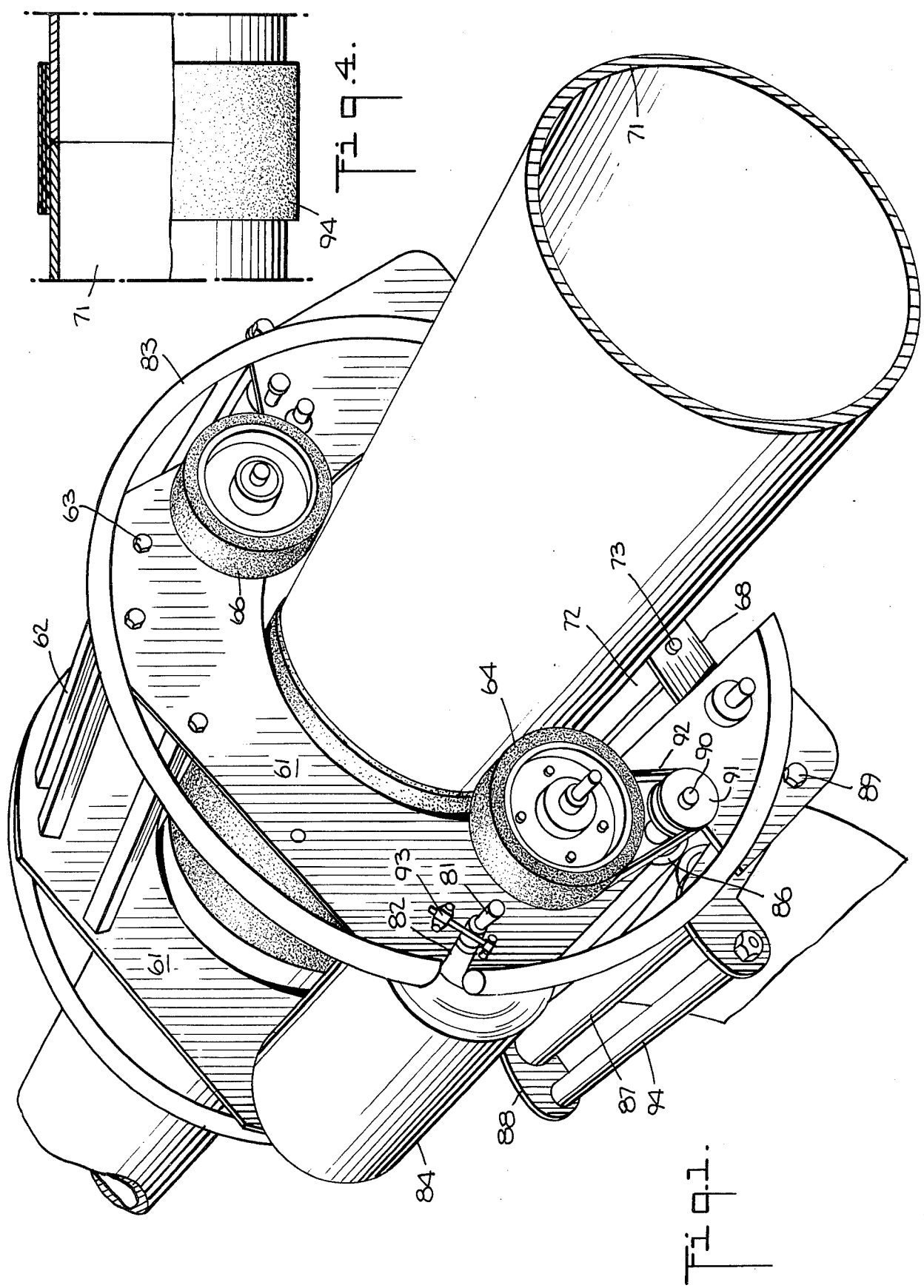

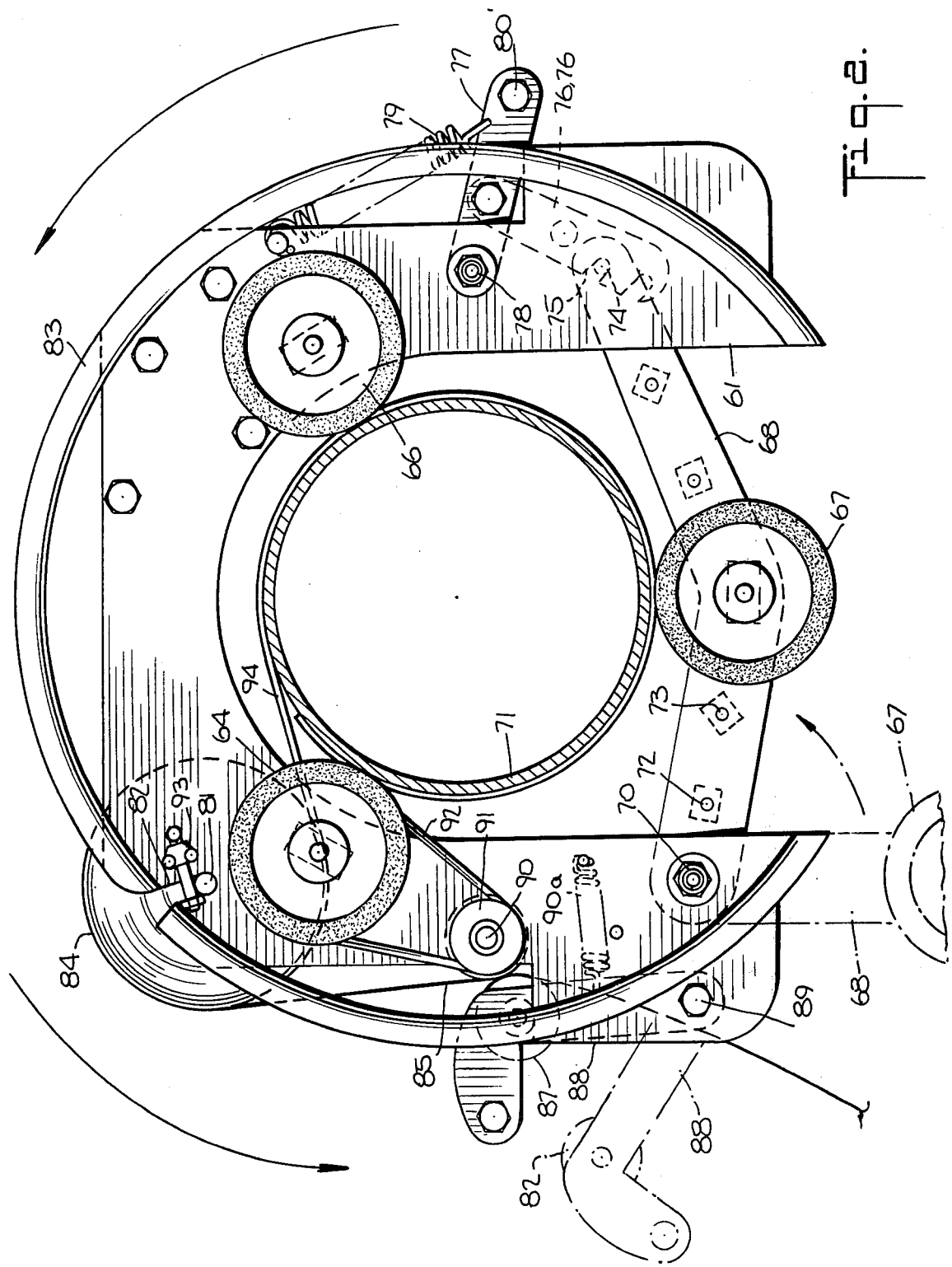

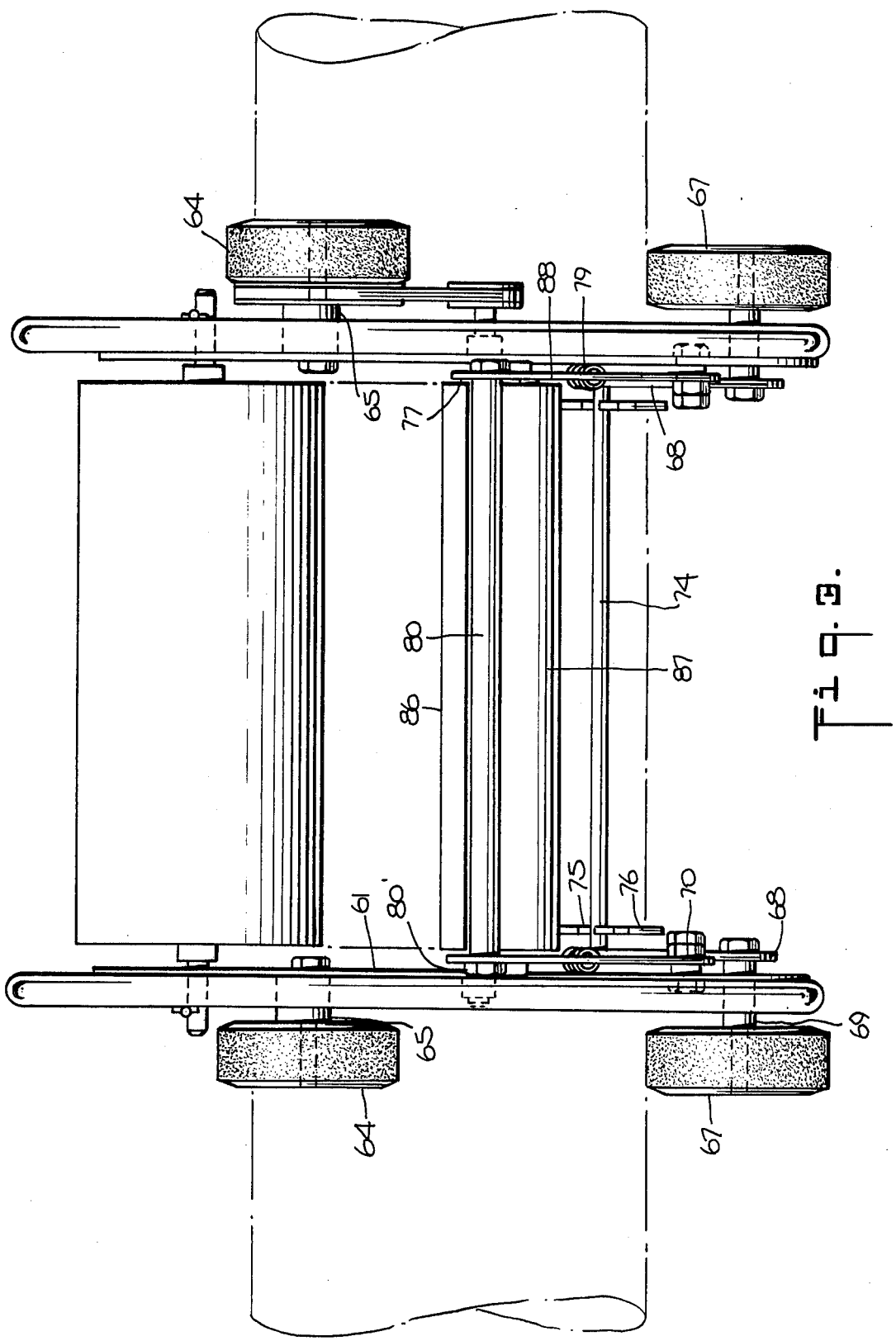

PIPE JOINT WRAPPING MACHINE

This invention relates to a pipe wrapping machine. More particularly this invention relates to a pipe wrapping machine for wrapping a protective strip of material about a pipe. More especially this invention relates to a portable pipe joint wrapping machine which is manually operable for wrapping a protective strip of material about a pipe joint.

BACKGROUND OF THE INVENTION

Pipe wrapping machines have heretofore been provided which are adapted to wrap various types of protective material about pipes either before shipment or in the field before or after placement. Some such pipe wrapping machines which heretofore have been used in the field have been of great bulk and weight and in certain cases have required propulsion by some appropriate power means. For the purpose of avoiding the necessity for using pipe wrapping machines of great bulk and weight it has been heretofore proposed to employ a pipe wrapping machine which may be readily handled and which may be placed in position in relation to a pipe manually. Two such portable and manually operable pipe wrapping machines are disclosed in the Stuart, Jr. et al U.S. Pat. Nos. 3,470,057 and 3,547,731. The portable pipe wrapping machines disclosed in these patents are characterized by a pipe enveloping frame having a pipe receiving mouth, locking means mounted on the frame for disposition across the pipe receiving mouth so as to retain a pipe within the frame and means mounted on the frame for rotatably supporting the frame concentrically with the pipe held within the frame. The machine disclosed in U.S. Pat. No. 3,470,057 is organized to apply a strip of protective sheet material continuously about a pipe in the form of an adherent overlapping spiral as the machine is rotated manually about the pipe with concomitant travel of the machine along the pipe. The machine of U.S. Pat. No. 3,547,731 is a machine organized to apply a strip of protective sheet material about a pipe joint, the machine being manually rotated about a pipe joint while in one position relative to the longitudinal extent of the pipe. The pipe wrapping machine disclosed in each of these patents enables the operator to apply to a pipe a wrapping material of the type which requires the application of heat in order to make it adhere to the pipe surface and provide an effective protection against moisture and other corrosive influences contained in soil. For example, the wrapping material used in the pipe wrapping machines referred to may be an asphalt-impregnated or tar-impregnated asbestos felt and an inner layer of glass fiber embedded in a material such as thermoplastic tar or asphalt which is sufficiently thermoplastic so as to be rendered adhesive by application of heat. Until the surface layer is rendered thermoplastic by the application of heat it is so lacking in adhesiveness that a strip of the wrapping material may be formed into a roll from which the wrapping material is fed for application to the surface of the pipe on which the pipe wrapping machine has been positioned. Because the surface layer is not thermoplastic or tacky until heated it is not necessary to employ a separator sheet between the plies of the wrapping material in the roll that is used in the machine. The machine of each of the patents includes means whereby material to render the surface to be contacted with the pipe sufficiently thermoplastic and tacky to enable proper adhesion.

GENERAL DESCRIPTION OF THE INVENTION

It is an object of this invention to provide an improved portable manually operable pipe joint wrapping machine by which a strip of protective material may be applied to the surface of a pipe joint using a wrapping material of the cold wrap type which does not require the application of heat in order to effect its adhesion to a pipe.

It is a further object of this invention to provide a manually operable portable pipe joint wrapping machine which is suitable for the application of a pipe wrapping material of the cold wrap type from a roll of the pipe wrapping material wherein adjoining plies of the roll are separated from each other by an intervening separator sheet.

It is a further and more particular purpose of this invention to provide a pipe joint wrapping machine of the character mentioned which comprises means for receiving and disposing of the separator sheet as it is stripped from the wrapping material during the travel of the wrapping material from the roll from which it is supplied to the surface of the pipe about which the wrapping material is being wrapped.

It is a further purpose of this invention to provide in a pipe joint wrapping machine of the character referred to means for receiving the separator sheet that is stripped from the wrapping material that is powered by power derived from a wheel which is maintained in frictional contact with the surface of the pipe and is rotated during rotation of the pipe wrapping machine about the pipe.

Further objects of this invention relate to the attainment of the foregoing objectives in a machine which when manually rotated about a pipe in the region of a pipe joint wraps a band of the wrapping material about the pipe joint while remaining in one position relative to the longitudinal extent of the pipe.

The wrapping machine of this invention is of the type which utilizes a frame having a pipe receiving mouth, locking means mounted on the frame for disposition across the pipe receiving mouth to retain a pipe therein and means mounted on the frame for rotatably supporting the frame concentrically on a pipe. There is a reel assembly that is mounted on the frame and which is adapted for rotatably supporting a roll of the wrapping material in position to be payed out therefrom and wrapped about a pipe held within the frame during rotation of the frame about the pipe. As aforesaid the wrapping material is of the cold wrap type which because of the tackiness of the surface thereof that comes in contact with the pipe requires the placing of a protector sheet between the adjoining plies of the roll of wrapping material.

According to this invention there is mounted in secured relation to the frame a rotatably mounted wheel which by virtue its frictional contact with the surface of the pipe is rotated as the frame is rotated about the pipe for the purpose of applying the wrapping material to the pipe. The power supplied by the rotation of the wheel is transmitted from the wheel by suitable means to a sheet receiving assembly that comprises a moving surface disposed for receiving thereon the separator sheet as it is stripped from the wrapping material during the travel of the wrapping material from the supply roll to the pipe while the frame is being rotated about the pipe. In the embodiment shown for illustrative purposes in the accompanying drawings the moving surface which receives the wrapping material is provided by a roller which is one of a pair of rollers having a nip therebetween into which the protective sheet is fed as it is stripped from the wrapping material being wrapped around the pipe by rotation of the frame about the pipe. The wheel which is used to power the moving surface provided by the abovementioned roller may conveniently be one of the wheels which is comprised in the means for rotatably supporting the frame concentrically with respect to the pipe that is held within the frame.

DETAILED DESCRIPTION

The foregoing as well as further objects, features and advantages of this invention will be apparent from the following description of certain preferred embodiments that exemplify this invention in connection with the accompanying drawings, wherein FIG. 1 is a perspective view of a preferred embodiment of the pipe wrapping machine of this invention that is adapted to apply a wrapping material about a joint between abutting pipe sections on which the machine has been placed, FIG. 2 is a front view of the machine shown in FIG. 1, FIG. 3 is a side view of the machine shown in FIG. 1, and FIG. 4 is a side view partially in section of a pipe joint showing wrapping material as applied thereto by the machine shown in FIGS. 1 to 3.

The pipe wrapping machine of this invention shown in FIGS. 1 to 4 is especially designed for use in applying a strip of wrapping material of the cold wrap type about a pipe joint. Cold wrap wrapping material for wrapping pipes is well known and is obtainable from various manufacturers of such material. The wrapping material provides a protective waterproofing adherent covering and usually has a coal tar base with which some plasticizer is used for the purpose of preserving the plasticity of the wrapping material and providing tackiness which facilitates the adhesion of the wrapping material to the surface of the pipe during the wrapping operation. In order to improve upon the adhesion of the wrapping material to the pipe it is common practice to apply to the surface of the pipe a primer which is adapted to afford a solvent action on the surface of the wrapping material so as to make the surface of the wrapping material more adherent and more readily affixed in continuous waterproofing relation with respect to the pipe surface. Strips of cold wrap material are supplied in the form of rolls each roll containing a sufficient number of plies of the wrapping material to provide the spiral wrapping over a substantial length of pipe. Because of the tackiness of the cold wrap type of wrapping material it is the practice to interpose between each ply of the roll of wrapping material a thin separator sheet which serves the purpose of preventing the plies from sticking together in the roll. The separator sheet usually is quite thin and may be made of a variety of different materials, e.g., polyethylene or Teflon. Silicone treated paper also is used. The separator sheets take many different forms and may be made of many different materials but have the common attribute of serving as a thin separator sheet which must be stripped from the wrapping material when the wrapping material is applied to the surface of a pipe. The pipe wrapping machine shown in FIGS. 1 to 4 provides an improved apparatus which comprises means whereby the wrapping material may be payed out from a roll of wrapping material of the character just mentioned and wrapped about a pipe joint in combination with sheet receiving means for handling the protector sheet as it is stripped from the wrapping material when it is passed from the roll of wrapping material for application to the pipe surface.

The wrapping material is applied by rotating the frame of the pipe joint wrapping machine about a pipe held concentrically within the frame and since the application of the wrapping material is confined to the region of a pipe joint between abutting pipe sections only a single revolution of the frame ordinarily is required although additional layers may be readily applied. The machine of this invention is primarily intended for wrapping joints between sections of pipe of the type that is extensively used for gas lines, water lines, petroleum pipelines and the like. Usually the pipe size will be in the range from about 8 inches to about 16 inches in diameter, although the machine can be made so as to accommodate pipes of other sizes. However, it usually is preferable that the machine be used in connection with pipe sizes that differ in diameter from each other by not more than about 2 inches. The pipe joint wrapping machine of this invention is especially suitable for wrapping pipe joints comprised in a pipe installation of considerable length wherein the pipe diameter remains constant. However, the locking means is so constructed as to accommodate variations in size to the extent indicated.

The embodiment of the pipe joint wrapping machine shown in FIGS. 1-4 comprises a pair of aligned U-shaped frame members, namely, frame members 61 which are fixed with respect to each other by means of a plurality of cross bars 62 which are secured at each end to each of the frame members by means such as threaded end portions that project through suitable apertures in the respective frame members for receiving threaded locking nuts 63. The frame members 61 are dimensioned so that the mouth of the cavity formed by virtue of the U-shape is of sufficient size to pass over the pipe sections in the region of the pipe joint to be wrapped. The frame members are rotatably supported for rotation concentrically with respect to the pipe that is confined within the frame members. Three pairs of oppositely disposed wheels are employed for this purpose, the wheels of each of the pairs of wheels being mounted so that their axes of rotation are normal with respect to the plane of the frame members with the result that when the machine is rotated about the pipe the machine will remain in substantially the same position with reference to the longitudinal extent of the pipe.

Two of the pairs of the wheels are in fixed relation to the frame members 61 while the other pair is held by a locking arm which is manually actuatable so as to move the wheels held thereby out of the way to a position for receiving the pipe within the frame members and thereafter move the wheels into position for locking the frame members in concentric rotatably supported relation with respect to the pipe. The pair of wheels 64, 64 is rotatably mounted in fixed relation to the frame members 61 so as to be spaced therefrom by the spacer blocks 65, 65. Another pair of wheels, only one of which is shown and which is indicated by the reference character 66, is mounted in fixed relation to the frame members in the same manner hereinabove described in connection with the pair of wheels 64, 64. The third pair of wheels 67, 67 is carried in approximately the midportion of the pair of aligned spaced arms 68, 68, the wheels 67, 67 being respectively secured in rotatable relation thereto and spaced therefrom by the spacer blocks 69. The arms 68, 68 are swingable about the pivot bolts 70 so that they may be swung between the locking position shown in solid lines in FIG. 2 to the position shown in dotted lines in FIG. 2 in which latter position the mouths of the frame members are completely opened so as to freely admit the introduction or removal of the pipe 71. The arms 68, 68 are maintained in integral spaced relation with respect to each other by means of cross bars 72 which have threaded extensions that pass through appropriate apertures in the arms for the reception of lock nuts 73. Each end of a latching rod 74 is respectively secured to each of the arms 68, 68 adjacent the free ends thereof and is of a size that is appropriate for being received in notches 75 in the latching members 76, 76 that are secured in free swinging relation with respect to the manually operated levers 77, 77 at approximately the mid-portion of these levers. The levers 77, 77 are mounted on each of the frame members respectively for rotation about the pivot bolts 78 and the free ends of the levers 77, 77, respectively, are resiliently urged upwardly (when the machine is in the position shown in FIG. 2) by the tension springs 79 having one end secured to each of the levers 77, 77 the other end being secured to each of the frame members. The rod 80 extends between the remote ends of the levers 77, 77 in secured relation thereto in position to be readily grasped by the machine operator to release the armms 68, 68 by pushing the ends of the levers 77, 77 downwardly (as shown in FIG. 2) against the tension of the springs 79 so as to cause the latching rod 74 to be forced out of the notches 75, 75 in the members 76, 76 and thereby release the arms 68, 68 so as to fall by gravity to the position partially shown in dotted lines in FIG. 2. When in this position the machine can be lowered onto the pipe 71 or lifted therefrom as the case may be. When the machine has been lowered onto a pipe and it is desired to lock the pipe concentrically within the frame, the arms 68, 68 are swung upwardly while the ends of the manually actuated latching levers 77, 77 are depressed to a position which enables the latching rod to be received in appropriate notches 75, 75 in the members 76, 76.

A roll 84 of wrapping material of the cold wrap type hereinabove described is rotatably held on an arbor 81 which when the machine is in the position shown in FIGS. 1 and 2 may be dropped into the notches 82 in the frame members 61. C-shaped handles 83 are secured to each of the frame members 61, a space therein being provided in the region of the notches 82 to permit the dropping of the arbor 81 into the notches 82 in the frame members. After the roll 84 has been placed in position in the notches 82, the arbor 81 is locked in place in the notches by the locking device 93. The roll 84 of wrapping material is made up with a protector sheet 85 between each of the plies of the roll. The wrapping material 94, as best indicated in FIG. 2, is fed from the periphery of the roll 84 and to the periphery of the pipe 71 as the machine is rotated about the pipe. It is wrapped once around the pipe with some overlap after which the wrapping material is severed inasmuch as only a single wrap-around of the wrapping material usually is required at the pipe joint.

As shown in FIGS. 1 and 2 the sheet receiving assembly for receiving the protector sheet 85 comprises a moving surface presented by the roller 86 which is rotatably mounted between the frame members 61. The roller 86 cooperates with another roller 87 which normally is positioned so that the protector sheet is received at the nip between the rollers 86 and 87. In order to facilitate the threading of the protector sheet into the nip between the rollers 86 and 87 when the pipe joint wrapping operation is being initiated, the roller 87 is rotatably mounted adjacent the end of the arms 88 which are swingable about the pivot bolts 89 by which the arms are secured to the frame members 61. The arms 88 are urged into position so that the roller 87 normally is in resilient contact with the roller 86 provided by the tension springs 90a which are secured at one end to the frame members 61 and at the other end to the arms 88 as shown. The arms 88 at their outer ends extend outwardly from the frame members and at their outermost extremity a handle bar 94 is fixed in secured relation between them so that the operator by grasping the handle may depress the arms to the position shown in dotted lines in FIG. 2 thereby permitting the protector sheet 85 to be readily brought down into position to be received between the rollers 86 and 87 when they are thus separated and then held in the nip between them when the arms 88 are restored to the position shown in solid lines in FIG. 2 by the action of the tension springs 90a.

The roller 86 has a stud 90 extending therefrom which passes through an aperture in one of the frame members 61 and which has a pulley 91 affixed thereto having a belt track on the surface thereof. One of the wheels 64 also is provided with a belt track so that the belt 92 may travel between the two belt tracks thus provided so that the rotation of the wheel 64 in frictional relation to the periphery of the pipe will rotate the pulley 91 and thereby provide a power drive for the moving surface presented by the roller 86. By suitably dimensioning the diameters of the belt tracks and the roller 86 the peripheral speed of the roller 86 may be caused to be substantially the same as the rate at which the protector sheet is stripped from the roll of wrapping material while the machine is rotated about the pipe for applying a layer of the wrapping material about the pipe joint.

The embodiment of FIGS. 1 to 4, as it has been shown and described, does not include means for resisting the paying out of wrapping material from the roll 84 for the purpose of imposing tension on the wrapping material as it is wrapped about the pipe joint. When the machine is so constructed, the application of the wrapping material only once or twice around the pipe joint is such that it is convenient for the operator to place his hand on the roll of wrapping material as the wrapping material is payed out and in this manner manually control tension. However, if desired, the roll of wrapping material may be rotatably mounted so that its rotation is resisted as by the use of an adjustable spring loaded clutch.

When using the embodiment shown in FIGS. 1 to 4 the normal procedure is to manually lower the machine onto the abutting pipes in the region of the pipe joint to be wrapped after the mouth-loading assembly has been manually actuated so as to move the wheels 67 out of the way. The operator thereupon restores the wheels 67 to locking position. A roll of the wrapping material is then dropped into place and the leading edge is guided by hand onto the pipe surface while at the same time the leading edge of the protector sheet is guided into position for contact with roller 86 while the rollers 86 and 87 are caused to become separated from each other responsive to manual actuation. The rollers 86 and 87 are then returned to position wherein they are in abutting resilient contact with the leading edge of the protector sheet in the nip between them. Thereupon, with the aid of the C-shaped handles, the machine is rotated once around the pipe joint so as to deposit with some end overlap a layer of the wrapping material so as to overlie the pipe joint as shown in FIG. 4. Of course, the wrapping material, if desired, may be wrapped a plurality of times about the pipe joint. After the desired amount of wrapping material has been deposited, both it and the protector sheet are severed at the pipe joint, the locking wheels 67 are moved out of the way, and the machine is lifted from the pipe and removed.

We claim:

1. In a portable pipe wrapping machine for wrapping a pipe manually which comprises a pipe enveloping frame having a pipe receiving mouth, locking means mounted on said frame for disposition across said pipe receiving mouth to retain a pipe therein, and means mounted on said frame for rotatably supporting said frame concentrically on a pipe, the improvement which comprises a roll assembly that is mounted on said frame and that is adapted to receive and rotatably support a roll of wrapping material preformed with a separator sheet that is strippable therefrom and that in said roll separates adjoining plies of said wrapping material from each other with said roll in position for feeding wrapping material from said roll onto said pipe during rotation of said frame about said pipe, a sheet receiving assembly mounted in said frame that comprises a rotatable member presenting when rotated a moving surface adapted and positioned for receiving said separator sheet that is stripped from said wrapping material concomitantly with travel of said wrapping material from said roll to said pipe during rotation of said frame about said pipe, a wheel rotatably mounted in secured relation to said frame for frictional contact with said pipe and for rotation responsive to rotation of said frame about said pipe with said wheel in frictional contact therewith, means responsive to rotation of said wheel for rotating said rotatable member with movement of said travelling surface presented thereby at a rate sufficient to recieve thereon said protector sheet as it is stripped from said wrapping material during travel of said wrapping material from said roll to said pipe.

2. A portable pipe wrapping machine according to claim 1 wherein said means for rotating said rotatable member rotates said member to provide movement of said travelling surface at a rate that is synchronized for substantial correspondence with the rate of travel of said wrapping material from said roll to said pipe.

3. In a portable pipe wrapping machine for wrapping a pipe manually which comprises a pipe enveloping frame having a pipe receiving mouth, locking means mounted on said frame for disposition across said pipe receiving mouth to retain a pipe therein, and means mounted on said frame for rotatably supporting said frame concentrically on a pipe, the improvement which comprises a reel assembly that is mounted on said frame and that is adapted to receive and rotatably support a roll of wrapping material preformed with a separator sheet that is strippable therefrom and that in said roll separates adjoining plies of said wrapping material from each other with said roll in position for feeding wrapping material from said roll onto said pipe during the rotation of said frame about said pipe, a sheet receiving assembly mounted on said frame that comprises a pair of rotatably mounted rollers adapted and positioned with a nip therebetween for receiving separator sheet stripped from said wrapping material as said wrapping material travels from said roll to said pipe during rotation of said frame about said pipe, a wheel rotatably mounted in secured relation to said frame for frictional contact with said pipe and for rotation responsive to rotation of said frame about said pipe, means responsive to rotation of said wheel for rotating at least one of said rollers to receive said protector sheet between said rollers as it is stripped from said wrapping material during travel of said wrapping material from said roll to said pipe.

4. A portable pipe wrapping machine according to claim 3 which comprises manually actuatable means for moving said rollers between abutting relation at the nip between said rollers and substantially spaced relation.

5. A portable pipe wrapping machine according to claim 3 which comprises manually actuatable means for increasing the separation of said rollers and resilient means for restoring said rollers to abutting relation at the nip therebetween.

6. A portable pipe wrapping machine according to claim 3 wherein said wheel is comprised in said means for rotatably supporting said frame concentrically on said pipe.

7. A portable pipe wrapping machine according to claim 3 wherein said means for rotating at least one of said rollers responsive to rotation of said wheel is synchronized for substantial correspondence with the rate of travel of said wrapping material from said roll onto said pipe.

* * * * *